United States Patent
Boddie

(10) Patent No.: US 6,362,302 B1
(45) Date of Patent: Mar. 26, 2002

(54) METHOD AND COMPOSITIONS FOR SPRAY MOLDING POLYURETHANE THREE DIMENSIONAL OBJECTS

(76) Inventor: Carl E. Boddie, 6941 Dillon St., Hou, TX (US) 77075

( * ) Notice: Subject to any disclaimer, the term of this patent is extended or adjusted under 35 U.S.C. 154(b) by 0 days.

(21) Appl. No.: 09/449,871

(22) Filed: Nov. 29, 1999

(51) Int. Cl.⁷ .............................................. C08G 18/32
(52) U.S. Cl. ........................ 528/73; 528/76; 521/158; 521/163; 264/309; 264/337; 524/789
(58) Field of Search ................... 528/73, 76; 521/158, 521/163; 264/309, 337; 524/789

(56) References Cited

U.S. PATENT DOCUMENTS

| | | | |
|---|---|---|---|
| 4,032,686 A | 6/1977 | Emmons | 428/425 |
| 4,101,527 A * | 7/1978 | Cunningham et al. | 528/73 |
| 4,118,376 A | 10/1978 | Pedain et al. | 528/59 |
| 4,264,705 A * | 4/1981 | Allen | 430/271 |
| 4,299,867 A | 11/1981 | Emmons et al. | 427/377 |
| 4,306,998 A | 12/1981 | Wenzel et al. | 260/13 |
| 4,373,008 A | 2/1983 | Emmons et al. | 428/413 |
| 4,376,844 A | 3/1983 | Emmons et al. | 525/117 |
| 4,396,681 A | 8/1983 | Rizk et al. | 428/423.1 |
| 4,397,974 A | 8/1983 | Goyert et al. | 524/143 |
| 4,471,102 A | 9/1984 | Petschke | 528/49 |
| 4,504,647 A | 3/1985 | Zabel et al. | 528/68 |
| 4,507,411 A | 3/1985 | Gordon et al. | 523/436 |
| 4,659,748 A | 4/1987 | Boddie | 521/170 |
| 4,695,618 A | 9/1987 | Mowrer | 528/55 |
| 4,707,532 A * | 11/1987 | Gail | 528/45 |
| 4,816,542 A | 3/1989 | Liebl et al. | 528/59 |
| 4,853,454 A | 8/1989 | Merger et al. | 528/59 |
| 4,940,558 A | 7/1990 | Jarboe et al. | 264/46.7 |
| 4,952,621 A * | 8/1990 | Bandlish | 524/195 |
| 5,041,494 A | 8/1991 | Franke et al. | 524/588 |
| 5,045,602 A | 9/1991 | Wamprecht et al. | 525/327.2 |
| 5,059,672 A | 10/1991 | Engebretson | 528/64 |
| 5,128,423 A | 7/1992 | Parrinello et al. | 525/440 |
| 5,128,433 A | 7/1992 | LeCompte et al. | 528/60 |
| 5,223,174 A | 6/1993 | Chou et al. | 252/194 |
| 5,229,454 A | 7/1993 | Weichmann | 524/714 |
| 5,258,482 A | 11/1993 | Jacobs et al. | 528/49 |
| 5,264,148 A | 11/1993 | Chou et al. | 252/194 |
| 5,278,223 A | 1/1994 | Gruenewaelder et al. | 524/502 |
| 5,360,642 A | 11/1994 | Chandalia et al. | 427/385.5 |
| 5,370,908 A | 12/1994 | O'Connor et al. | 427/385.5 |
| 5,401,582 A | 3/1995 | Weyland et al. | 428/473 |
| 5,412,056 A | 5/1995 | Zwiener et al. | 528/73 |
| 5,430,089 A | 7/1995 | Harris et al. | 524/315 |
| 5,461,135 A | 10/1995 | Malofsky et al. | 528/60 |
| 5,466,769 A | 11/1995 | Chou | 528/60 |
| 5,470,907 A | 11/1995 | Wallon et al. | 524/507 |
| 5,496,642 A | 3/1996 | Martinez et al. | 428/423.1 |
| 5,506,328 A | 4/1996 | Chandalia et al. | 528/49 |
| 5,506,329 A | 4/1996 | Chou et al. | 528/60 |
| 5,554,682 A | 9/1996 | Harris et al. | 524/523 |
| 5,571,922 A | 11/1996 | Chou | 548/215 |
| 5,576,411 A | 11/1996 | Yeske et al. | 528/70 |
| 5,591,819 A | 1/1997 | Chou et al. | 528/73 |
| 5,624,614 A * | 4/1997 | Chapman | 264/154 |
| 5,646,227 A | 7/1997 | Slack et al. | 528/28 |
| 5,670,599 A | 9/1997 | Bassner | 528/59 |
| 5,679,794 A | 10/1997 | Suhadolnik et al. | 546/186 |
| 5,691,439 A | 11/1997 | Slack et al. | 528/49 |
| 5,707,941 A | 1/1998 | Haberle | 528/44 |
| 5,744,569 A | 4/1998 | Bruchmann et al. | 528/73 |
| 5,747,628 A | 5/1998 | Schmalstieg et al. | 528/60 |
| 5,747,629 A | 5/1998 | Yeske et al. | 528/70 |
| 5,756,170 A | 5/1998 | Licht et al. | 428/35.7 |
| 5,840,823 A | 11/1998 | Licht et al. | 528/73 |
| 5,977,285 A * | 11/1999 | Moos et al. | 528/73 |

OTHER PUBLICATIONS

Klempner & Frisch; Polymeric Foams; 1991; pp. 80–81.*

* cited by examiner

*Primary Examiner*—Rachel Gorr
(74) *Attorney, Agent, or Firm*—Howrey Simon Arnold & White; Floyd Nation; Carter J. White

(57) ABSTRACT

A method of producing three dimensional polyurethane shapes by spray molding a quasi-gel like polymer precursor composition that is first mixed and then sprayed by a spray gun. The spray coating of quasi-gel polymer precursor composition subsequently cures to form a molded polyurethane polymer shape. Such artificial three dimensional shapes may include rocks, rock walls or faces, tree stumps or limbs, animals, architectural features or settings in which a certain visual appearance is desired. The method includes: creating a mold and supporting cradle having a mold cavity conforming to the exterior of shape desired, the mold having a substantial degree of flexibility; spraying a quasi-gel polymer precursor composition into the mold cavity, the quasi-gel polymer precursor composition comprising a mixture of an isocyanate portion and a curative portion and being mixed prior to introduction into a spray gun, carrying out the spraying to build up the molded three dimensional shape to a desired thickness and stripping the cradle and mold from the molded polyurethane three dimensional shape after the curing of the quasi-gel polymer precursor.

14 Claims, No Drawings

METHOD AND COMPOSITIONS FOR SPRAY MOLDING POLYURETHANE THREE DIMENSIONAL OBJECTS

BACKGROUND

The use of artificial three dimensional shapes in artistic, architectural and landscaping applications has increased over the past decade. Museum displays, theme and entertainment park sets, motion picture and television sets, demonstration models, and consumer product prototypes and other similar three dimensional shapes are all examples of the use of the use of artificial three dimensional shapes in which the use of a genuine item is inappropriate, costly or both.

In the past, artificial three dimensional shapes have been made by a variety of processes utilizing a wide range of materials. However there remains an unmet need for a method of forming such three dimensional shapes under "field" conditions and at reasonable cost.

Polyester fiberglass has been employed in the past for producing three dimensional shapes but presents a problem in that of requiring a gel coat or barrier coat to be first sprayed in the mold. The polyester resin conventionally employed for structural strength requires fiberglass reinforcing due to the inherent brittleness of the polyester resin. Also low production is encountered due to the curing time of the resin thus limiting production to one or two parts per mold per day.

Plaster and concrete have also been employed but are of disadvantage in that they are often too heavy for producing large three dimensional shapes. Further, intricate shapes with high fidelity to the original surface is not always possible due to shrinkage and other factors. Durability, weathering and resistance to cracking and chipping represent further problems. Production is also generally limited to one or two parts per mold per day due to the drying time needed to solidify the cast shape.

Three dimensional shapes may be made in solid form of one type of plastic or another but have been limited in variety of design because of the high cost of molding as well as requiring time for production of both the mold and the molded product. For artistic, architectural or landscaping purposes different sizes and types of three dimensional shapes may be desirable and high mold costs and operation expenses may be limiting factors in the production shapes having slightly different size or appearance to simulate a natural setting.

A further problem is that in some cases, the three dimensional shape may be too large or heavy to move or install if the shape is not made on location (i.e. in the field). For example an artificial tree or rock wall often must be made in manageable sections and then assembled on site resulting in seams and other undesirable effects.

Larger structures, such as tree stumps, rocks, or rock walls also present the challenge in that they often lack the durability, strength and hardness to withstand the rigors of the environmental wear and tear that might be occasioned. Such shapes, if used in an outdoor setting, must be able to withstand a load, weathering over a period of time and substantial physical abuse by the public that may be encountered in the landscape or other type of setting in which the shapes are employed.

Conventional spraying of a polyurethane coating is carried out by employing expensive and difficult to control heated plural component equipment for delivering an isocyanate side and a polyol side to a spray gun where the polymerization reaction is initiated in a mixing chamber inside the gun. Because an exact ratio of the isocyanate and polyol components must be metered to the spray gun, difficulty or constant adjustment of the mixture may be needed as the two differing components change in characteristics (i.e. viscosity, temperature, lot composition) over time in order to achieve a consistent final product. Conventional plural equipment, such as that manufactured by Gusmer, Glascraft, Graco or Binks, is typical of the prior art method of spray dispensing polyurethane. The spray parameters of temperature and pressure employed in the process entail the use of a primary heater, a hose heater and a spraying pressure ranging from 500 PSI to 3000 PSI. Due to the potentially adverse impact of changing conditions of temperature, humidity, moisture content of the substrate or mold onto which the polyurethane is being sprayed and other environmental conditions, the use of this equipment requires skill and considerable experience. In addition a substantial capital expenditure is needed to obtain the necessary metering pumps and heater equipment. For this reason, spray coating of polyurethane remains a specialized skill that must be conducted under carefully controlled conditions in order to achieve a consistent high quality polyurethane coating.

An example of the above noted method which is representative of the state of the art for the production of artificial rocks is U.S. Pat. No. 4,940,558. As is specifically disclosed therein, a two component system is utilized to spray a polyurethane coating into a flexible mold. However, as noted above, the application of the techniques disclosed therein is not practicable for a significant number of persons due to the high capital cost and specialized skill and equipment necessary to achieve a consistent product. In addition, because the conditions of spraying must be carefully controlled, on-site coating of a preformed three dimensional shape, such as a wooden form or a expanded polystyrene foam core or a wall or other surface is not possible. In most cases, the presence of atmospheric moisture, a lack of temperature control, or the inability to control the metering pumps accurately under differing conditions results in a blistered or otherwise inferior coating.

Thus there exists an unmet need for a simple to use polyurethane coating method that can be used by the average person under conditions encountered in everyday life.

SUMMARY OF THE INVENTION

The present invention is generally directed to a method of producing three dimensional polyurethane shapes by spray molding a quasi-gel like polymer precursor composition that is first mixed and then sprayed by a hopper type spray gun. The spray coating of quasi-gel polymer precursor composition subsequently cures to form a molded polyurethane polymer shape. Such artificial three dimensional shapes may include rocks, rock walls or faces, tree stumps or limbs, animals, or art objects for use in creating displays, sets or other life-like settings. Further the three dimensional shape may be a prototype of a consumer product or other specialty product or part, or the three dimensional shape may be utilized in architectural settings in which a certain visual appearance is desired. An illustrative method of the present invention includes: creating a mold and supporting cradle having a mold cavity conforming to the exterior of shape desired, the mold having a substantial degree of flexibility; spraying a quasi-gel polymer precursor composition into the mold cavity, the quasi-gel polymer precursor composition comprising a mixture of an isocyanate portion and a curative portion and being mixed prior to introduction into a spray gun, carrying out the spraying to build up the molded three dimensional shape to a desired thickness and stripping the cradle and mold from the molded polyurethane three dimensional shape after the curing of the quasi-gel polymer precursor.

These and other features of the present invention are more fully set forth in the following description of illustrative embodiments of the invention.

DESCRIPTION OF ILLUSTRATIVE EMBODIMENTS

The production of a three dimensional shape, such as a simulated rock, tree limb or stump, animals such as fish, birds, reptiles, or mammals or the like, with high fidelity to the original three dimensional shape can be achieved by the use of a high density polyurethane elastomer in a flexible rubber mold. The rubber may be natural rubber or synthetic rubber. A three dimensional shape is produced in molded form, not limited in size. A flexible mold may be prepared by applying numerous coats of liquid uncured rubber forming materials, such as latex rubber, upon the exterior of the three dimensional model. The addition of a fabric embedded within the rubber latex layers can be used to add strength and durability to the mold. A supporting cradle for the rubber mold may be produced by spraying a low density urethane foam composition over the mold. The formation and spraying of such a low density polyurethane foam may be by conventional means or preferably by use of the methods for forming a polyurethane foam as disclosed herein. The mold and cradle are removed from the three dimensional model and are sprayed with a quasi-gel polymer precursor composition as is described herein. The structural urethane elastomer is built up to substantial thickness to provide a strong rigid load bearing polyurethane molded three dimensional shape simulating the original three dimensional shape upon curing. After curing, the molded urethane three dimensional shape is removed and the mold may be reused for repeated molding operations. Where desired, the molded urethane three dimensional shape may be reinforced with an inner layer of low density urethane foam to reduce the amount of structural urethane employed. Alternatively after an initial layer of high density urethane is applied to the mold, a layer of reinforcing fiber or fabric may be applied and an additional coating of high density polyurethane applied. In this manner a composite structure is formed in the shape of the original three dimensional model.

By means of this invention it is possible to produce artificial rocks, artificial tree stumps and or limbs, artificial rock faces of varied shapes, surface appearance and sizes. Such molded three dimensional objects may be used in landscape settings of one type or another to simulate a natural environment. Their light weight, strength and resistance to weathering provide a wide range of usage.

The three dimensional shapes which may be prepared by the employment of quasi-gel polymer precursor compositions of the present invention can be utilized in a process commonly known in the trade by the acronym SIM, "Spray In Mold". The spraying is accomplished by use of a simple hopper type spray gun such as a gun type Model No. IP-LIN Model #2301 which is commercially available from Industrial Polymers, Inc. of Houston Tex. The use of such a system eliminates the high capital expense and high level of skill necessary to utilize a conventional two component proportioning equipment and impingement mix or static mix plural spray gun.

In the manufacture of the three dimensional shapes of this invention a flexible rubber mold is first prepared using a model of the three dimensional shape that is to be simulated. This three dimensional shape may be a natural rock or tree limb or stump, a plaster, clay or wood model of the object, or even machined polymer resin model of the three dimensional shape. Alternatively, a rubber mold may be made by carving or otherwise machining or cutting or shaping a block of rubber to form a mold. The rubber mold may be either of natural rubber or synthetic rubber and it will be understood that the term "rubber" encompasses both types and may also be described as elastomeric. The flexible mold may be simply and cost efficiently prepared by applying liquid uncured rubber forming materials, such as multiple coats of latex, to the exterior of the three dimensional model. A flexible reinforcing material, such as cheese cloth, fiber glass cloth or the like may be employed at intermediate stages of the application of the latex layers to provide integrity to the built up layers of latex which comprise when cured the rubber mold.

In order to provide support for the mold, a cradle support is provided by spraying low density polyurethane foam at a substantial thickness on the exterior of the rubber mold. The cradle support ensures that the mold which is in the form of a flexible liner holds the shape of the three dimensional model when removed. As is disclosed herein, this may be achieved by utilizing the compositions of the present invention combined with the metered addition of water to the quasi-gel polymer precursor compositions. Such a technique is disclosed in greater detail herein.

After the spraying has been completed and allowing a period of time for the curing of the molded polyurethane foam support cradle, the mold and cradle are easily separated from the original three dimensional model. The mold and cradle may then be employed for repetitive spray molding operations to produce polyurethane three dimensional shapes having high fidelity to the original model. In fact it is possible to achieve very high resolution and consistency with the method of the present invention such that fine details, such as the scalloping of a shell, the veins of a leaf, or the scales on a fish present on the original model may be reproduced.

In addition to utilizing the above noted molding methods, the compositions of the present invention may also be utilized in spray coating objects with a hard and durable polyurethane coating. For example a foam polystyrene three dimensional shape can be sprayed with the quasi-gel polymer precursor material of the present invention so that the resulting foam polystyrene three dimensional shape becomes coated with a hard polyurethane skin. This method is not limited to coating polystyrene, but can be used on a variety of porous and non-porous surfaces. Prior to the present invention, the spray coating of such objects was expensive and difficult due to the high cost of the equipment needed and the presence of moisture on the surface of the object to be coated resulting in bubbling. This is overcome by use of the methods and compositions of the present invention because the presence of moisture on the surface of the object to be coated is believed to actually accelerate the polymerization process. Thus it is possible to coat objects with a hard, durable, and bubble free polyurethane coating without the need for specialized equipment.

The advantages of the present invention can be further illustrated with the spray application of a hard shell polyurethane coating of object previously to large to be coated with a hard, durable, and bubble free polyurethane coating. In some cases, especially in architectural or museum or entertainment park settings or on a movie or television set, a large object, such as a boulder or rock column or large tree or rock face needs to be simulated. Due to the size of the simulated shape, the use of conventional two-part polyurethane spraying techniques can not be used due to the field conditions present at the site. In the past, such situations required a piece by piece assembly of the object with resulting seams. By utilizing the composition and methods of the present invention, one can spray coat a hard shell blister free polyurethane coating directly on site with little regard for environmental conditions or the moisture content of the surface. Further, it is possible to spray coat a hard shell polyurethane coating on other "in the field" objects such a boat decks or docks, outdoor or indoor working surfaces, vehicles, or other such surfaces that previously could not be coated using the two-part metered spraying techniques of the prior art. Such methods and techniques are contemplated as being within the scope of the present invention.

Yet another aspect of the present invention is the production of a rigid low density polyurethane foam utilizing the quasi-gel polymer precursor materials of the present invention. The formation of a rigid low density polyurethane foam may be achieved by the controlled inclusion of water during the spraying of the quasi-gel polymer precursor. The amount of water that should be introduced should be carefully controlled so that the foaming action caused by the reaction of the isocyanate component with the water achieves the desired result. This may be achieved by the introduction of sufficient water to the spray gun by way of a metered water line that mixes the water with the quasi-gel polymer precursor immediately prior to spraying. The result is a quasi-gel polymer precursor coating that has a foam like consistency and that upon curing forms a rigid low density polyurethane foam. One having skill in the art should appreciate that the present invention allows a person having minimal skill to apply a rigid low density polyurethane foam with a minimal of capital expense. This is in contrast with the present state of the art method of forming low density rigid polyurethane foams which require a high degree of skill and experience, a carefully metered mixture of components, controlled environmental conditions and capital intensive equipment. Thus by use of the compositions of the present invention it is possible to form a low density rigid polyurethane foam of high quality simply and inexpensively.

The methods of the present invention are based on the formation of a quasi-gel polymer precursor composition prior to application by a hopper type spray gun. The ability to mix and formulate the quasi-gel polymer precursor composition is an important aspect of the ability to eliminate the need for the heated and metered dual line spray guns that are currently the state of the art. The use of a simple hopper-type spray gun, such as a gun type spray gun, model No. IP-LIN Model #2301 available from Industrial Polymers, Inc. of Houston Tex. greatly reduces the initial and ongoing capital outlay. Further, by mixing the components in advance of the actual spraying operations, the composition and quality of the final polyurethane coating can be controlled and tailored to the specific application. A further benefit is that a small amount of polyurethane coating can be prepared and sprayed without the waste and effort needed for start-up and preparation using a conventional dual line heated and metered spray gun.

The quasi-gel polymer precursor composition of the present invention is formed by the combination of an isocyanate portion and curative portion as described herein. Mixing of the two portions can be carried out in a straightforward manner of combining the appropriate ratio of components and mixing to form a uniform gel like material. The mixture of the isocyanate portion and the curative portion of the quasi-gel polymer precursor should have a ratio from about 0.75:1.0 to about 1.25:1.00 and more preferably the ratio of the isocyanate portion and the curative portion should be about 1.14:1.00. When a polyurethane foam is to be formed, a slight increase in the amount of the isocyanate portion may be desirable because of the consumption of the isocyanated by reaction with the metered in water.

One of the unique aspects of the quasi-gel polymer precursor compositions of the present invention is that they remain a pliable, sprayable gel-like material for about 20 to 30 minutes. This permits the use of a hopper type spray gun in contrast to the current state of the art method which keeps the two components separate until the last possible moment prior to spray application. However, upon curing after approximately about 18 to about 24 hours, the quasi-gel polymer precursor composition forms a rigid polyurethane polymer. In addition to the "latency time" just described, the quasi-gel polymer precursor composition of the present invention can be sprayed onto vertical, inverted or other angled surfaces without sagging or running. Thus a relatively uniform coating can be applied to curved, flat, corrugated, angled, textured, or otherwise difficult to coat surfaces in a uniform and consistent manner.

The isocyanate portion of the quasi-gel polymer precursor composition of the present invention generally includes a mixture of an isocyanate based polymer resin and a aluminosilicate powder pre-dispersed in castor oil as a molecular sieve to prevent moisture contamination during the spray application. It has been found that a blend of 2,4 and 2,6 diphenyldiisocyanate, commercially available from Huntsman Corporation as Rubinate 9329 is especially preferred. Powdered aluminosilicates or powdered aluminosilicates suspended in oil such as castor oil, and more particularly Baylith L Paste available from Bayer Corporation is preferably utilized in formulating the Isocyanate portion of the quasi-gel polymer precursor composition of the present invention to prevent moisture contamination during the spray application.

The curative portion of the quasi-gel polymer precursor composition of the present invention generally includes a mixture of a rigid polymer resin, a gelling agent, a flexible polymer resin, a molecular sieve drying agent, a crosslinking agent, a suspension agent and a polymerization co-catalyst.

The rigid polymer resin may be any available polyol based polymer resin that imparts impact rigidity and impact resistance to the final polyurethane polymer. Preferably the rigid polymer resin is a combination of penta erythritol base quadra functional polyol such as Pluracol PEP-550 available from BASF Corporation and a polyether base triol, such as Poly G 76-120 available from Arch Chemical.

The gelling agent is an aromatic diamine, which is activated and contains at least one alkyl substituent in the ortho-position to a second amine group. By "active" diamines and polyamines it is intended to mean those aromatic diamines whose reactivity towards isocyanates has not been reduced to a level at which they react too slowly to be effective in causing the formation of the quasi-gel polymer precursor compositions disclosed herein. The aromatic diamine utilized in the present invention amounts to less than about 1% of the total weight of the final formulation. In one preferred embodiment Ethacure 100 available from Albemarle Corporation is utilized as the gelling agent.

In addition to a rigid polymer resin, a flexible polymer resin is utilized to impart a measure of flexibility and to temper the rigidity imparted by the rigid polymer resin components. Polyethers such as a polyether base triol, are preferred as the flexible polymer resin components, specifically, Poly G85-35 available from Arch Chemical is utilized.

A molecular sieve drying agent is incorporated into the formulation to prevent moisture contamination during the spray application. Commercially available powdered aluminosilicates or powdered aluminosilicates dispersed in oil are preferred, with Baylith L Paste, a powdered aluminosilicate dispersed in castor oil available from Bayer Corporation being especially preferred.

A suspension agent is included in the formulation so that upon mixing the components of the quasi-gel polymer precursor remain in a mixed state until the final curing of the quasi-gel polymer precursor compound into polyurethane. One such suitable suspension agent is AntiTerra U which is the salts from alkyamides and esters, available from BYK Cheme.

The polymerization co-catalyst is selected from catalysts utilized in the curing reactions involving isocyanate and polyols to form a polyurethane. The use of a cocatalyst may be needed to obtain the correct reaction rate to obtain suitable curing. The catalyst can be certain organometallic compounds, such as are known for use in carrying out polyurethane polymerizations. Certain organometallic based catalyst compositions such aryl mercurial compositions sold under the trade name CoCure by Cas Chem are preferably utilized. It is especially preferred that the co-catalyst be Cocure 55 which is a phenyl mercuric neodecanoate salt.

The crosslinking agent should be selected from compounds that upon exposure to water hydrolyze to form compounds having amine, alcohol, ketone or aldehyde functionality. Preferably the crosslinking agent is selected from aldimines, ketimines and oxazolidines.

One of skill in the art should appreciate that an aldimine is the condensation reaction product of an amine and an aldehyde. The synthesis of such compound is generally described in general organic chemistry books such as *Organic Chemistry*, 3d Ed. Morrison and Boyd, Library of Congress #72-91904 or The Merck Index, 12$^{th}$ Ed. #236 Mannich reaction, Section Named organic Reaction, Page 57 the contents of which are hereby incorporated herein by reference. Such compounds are commercially available and the preferred aldimine is IPD-139 A which is the reaction product of isophorone diamine and isobutyraldehyde available from Huls Corporation of America.

A ketimine is the condensation reaction of an amine with a ketone. The synthesis of ketimines is described in *Organic Chemistry*, 3d Ed. Morrison and Boyd, Library of Congress #72-91904 or The Merck Index, 12$^{th}$ Ed. #236 Mannich reaction, Section Named organic Reaction, Page 57 the contents of which are hereby incorporated herein by reference. One particularly preferred ketimine is the product of the condensation reaction of para-phenylenediamine with methyl amyl ketone.

The oxazolines that may be utilized are preferably selected from oxazolidines having the formula:

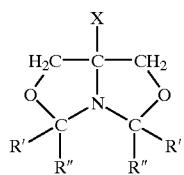

wherein X is selected to be hydrogen, $C_1$ to $C_8$ alkyls or $C_1$ to $C_8$ alkylol and R' and R" are independently selectable from hydrogen, $C_1$ to $C_8$ alkyl. The use of 1-aza-3,7-dioxa-5-ethylbicyclo (3.3.0) octane is the most preferred.

One of ordinary skill in the art should appreciate that the role of the oxazolidine is not that of a drying agent as is disclosed in U.S. Pat. No. 5,223,174. Rather, the oxazolidine serves as a water activated crosslinking agent and primary curing agent. Further it should be recognized that the presence of the oxazolidine is greater than about 1% in the formulations of the present invention which is in contrast to the use of an oxazolidine compounds as a drying agent in which the compounds are present at levels less than 1%. It will be appreciated by one of ordinary skill in the art of polyurethane resin formulation that at the concentration levels utilized as a drying agent, oxazolidiene does not substantially function as a curative agent. In contrast, the significantly higher concentration of oxazolidine in the compositions of the present invention impart the properties of a water activated curing agent.

Conventional pigments or colorants can be mixed with the quasi-gel polymer precursor compositions of the present invention to achieve a full spectrum of color shades. The only limit to the selection of such compounds is that they should be compatible with the formation and properties of the quasi-gel polymer precursor compositions and should not interfere with the subsequent polymerization reaction.

Sand or other particulate materials may also be mixed with the quasi-gel polymer precursor compositions of the present invention. Such mixing may occur prior to spraying or just after spraying but prior to the curing of the quasi-gel polymer precursor compositions into a polyurethane polymer coating. The inclusion of such particulate material may be desirable in cases in which a certain texture is desired or the luster of a mineral formation is sought in an artificial rock. Another potential application is in the preparation of a sprayable non-skid surface coatings. Such coatings would be particularly useful on boats, docks, the interior of military and construction vessels and the like where such surfaces are desired.

Fibers of a natural or synthetic nature may also be combined with the quasi-gel polymer precursors of the present invention. The addition of such fibers should provide for reinforcement and added strength to the cured polyurethane coating. Similarly, composite materials can be formed utilizing the spraying techniques of the present invention. For example, one could spray a surface with the quasi-gel polymer precursor composition, apply cheese cloth, carbon fibers, glass fibers, glass fiber cloth, metal fibers or metal cloth and other similar such materials and subsequently apply a second coating layer of quasi-gel polymer precursor composition. In view of the high tolerance for a environmental moisture, the application of this method may include the patching of pipelines, or storage tanks, the repair of composite structures in the field, and other similar applications where the conditions for the use of a conventional dual line spray gun is not possible.

Other applications and uses of the compositions of the present invention are contemplated or may be contemplated in the future. It is intended that such methods be encompassed by the present invention to the extent that they utilize the quasi-gel polymer precursor compositions disclosed herein.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLE 1

An oxazolidine base resin system of the present invention was formulated as follows.

All of the components are commercially available from the sources listed.

Isocyanate portion

| Trade Name | Amount (%) | Compound | Function | Manufacturer |
|---|---|---|---|---|
| Rubinate 9329 | 45% | Blend of 2,4 and 2,6 diphenyldiisocyanate | Polymer resin | Huntsman Chemical |
| Baylith L Paste | 8.25% | Aluminosilicate | Molecular Sieve | Bayer Corporation |

Curative Portion

| Trade Name | Amount (%) | Compound | Function | Manufacturer |
|---|---|---|---|---|
| Pluracol PEP-550 | 19.87% | pentaerythritol base quadra functional polyol | rigid polymer resin | BASF Corporation |
| Ethacure 100 | 0.676% | aromatic diamine | gelling agent | Albemarle Corporation |
| Poly G 85-35 | 5.91% | polyether base triol | flexible polymer resin | Arch Chemical |
| Poly G 76-120 | 4.55% | polyether base triol | rigid polymer resin | Arch Chemical |
| Baylith L Paste | 7.95% | aluminosilicate | Molecular Sieve | Bayer Corporation |
| CS-1246 | 7.78% | oxazolidine | crosslinker | Angus Chemical |
| AntiTerra U | 0.676% | | suspension agent | BYK Cheme |
| Cocure 55 | 0.0113% | | catalyst | Cas Chem |

The isocyanate portion and the curative portions of the illustrative resin were mixed in a ratio of about 1.14:1.00 to form a quasi-gel polymeric precursor intermediate. This quasi-gel polymer precursor upon standing will harden into the polymeric polyurethanes of the present invention.

Upon cure of the quasi-gel polymer precursor a polyurethane polymer is formed having the following properties:

| Property | Test method | Result |
|---|---|---|
| Tensile Strength | ASTM D 628 | 7000 psi |
| Elongation | ASTM D 628 | 15% |
| Flexural Modulus | ASTM D 790 | 280,000 psi |

EXAMPLE 2

An aldimine curing resin system of the present invention was formulated as follows.

All of the components are commercially available from the sources listed.

Isocyanate portion

| Trade Name | Amount (%) | Compound | Function | Manufacturer |
|---|---|---|---|---|
| Rubinate 9329 | 45% | Blend of 2,4 and 2,6 diphenyl-diisocyanate | Polymer resin | Huntsman Chemical |
| Baylith L Paste | 8.25% | Alumino-silicate | Molecular Sieve | Bayer Corporation |

Curative Portion

| Trade Name | Amount (%) | Compound | Function | Manufacturer |
|---|---|---|---|---|
| Pluracol PEP-550 | 22.65% | penta erythritol base quadra functional polyol | rigid polymer resin | BASF corporation |
| Ethacure 100 | 0.676% | aromatic diamine | gelling agent | Albemarle Corporation |
| Poly G 85-35 | 5.91% | polyether base triol | flexible polymer resin | Arch Chemical |
| Poly G 76-120 | 4.55% | polyether base triol | rigid polymer resin | Arch Chemical |
| Baylith L Paste | 7.95% | aluminosilicate | Molecular Sieve | Bayer Corporation |
| IPD-139 A | 5.00% | aldimine | crosslinker | Huls Corporation |
| AntiTerra U | 0.676% | | suspension agent | BYK Cheme |
| Cocure 55 | 0.0113% | | catalyst | |

The isocyanate portion and the curative portions of the illustrative resin were mixed in a ratio of about 1.14:1.00 to form a quasi-gel polymeric precursor intermediate. This quasi-gel polymer precursor upon standing will harden into the polymeric polyurethanes of the present invention.

Upon cure of the quasi-gel polymer precursor a polyurethane polymer is formed having the following properties:

| Property | Test method | Result |
|---|---|---|
| Tensile Strength | ASTM D 628 | 5500 psi |
| Elongation | ASTM D 628 | 20% |
| Flexural Modulus | ASTM D 790 | 200,000 psi |

EXAMPLE 3

An ketimine curing resin system of the present invention was formulated as follows.

The ketimine curing agent utilized was a para-phenylenediamine reacted with methyl amyl ketone under condensation conditions. In order to carry out such a condensation reaction, equal molar amounts of the two starting materials are combined in a suitable organic solvent and the mixture is brought to a reflux. The azeotrope of the resulting water/organic solvent is collected until such time as the production of water stops and the condensation reaction is complete.

The synthesis of ketimines is described in *Organic Chemistry*, 3d Ed. Morrison and Boyd, Library of Congress #72-91904 or The Merck Index, 12$^{th}$ Ed. #236 Mannich reaction, Section Named organic Reaction, Page 57 the contents of which are hereby incorporated herein by reference. All other components are commercially available from the sources indicated.

Isocyanate portion

| Trade Name | Amount (%) | Compound | Function | Manufacturer |
|---|---|---|---|---|
| Rubinate 9329 | 45% | Blend of 2,4 and 2,6 diphenyldiisocyanate | Polymer resin | Huntsman Chemical |
| Baylith L Paste | 8.25% | Aluminosilicate | Molecular Sieve | Bayer Corporation |

Curative Portion

| Trade Name | Amount % | Compound | Function | Manufacturer |
|---|---|---|---|---|
| Pluracol PEP-550 | 21.65% | penta erythritol base quadra functional polyol | rigid polymer resin | BASF corporation |
| Ethacure 100 | 0.676% | aromatic diamine | gelling agent | Albemarle Corporation |
| Poly G 85-35 | 5.91% | polyether base triol | flexible polymer resin | Arch Chemical |
| Poly G 76-120 | 4.55% | polyether base triol | rigid polymer resin | Arch Chemical |
| Baylith L Paste | 7.95% | alumino-silicate | Molecular Sieve | Bayer Corporation |
| Ketimine | 6.00% | ketimine | crosslinker | |
| AntiTerra U | 0.676% | | suspension agent | BYK Cheme |
| Cocure 55 | 0.013% | | catalyst | CasChem catalyst |

The isocyanate portion and the curative portions of the illustrative resin were mixed in a ratio of about 1.14:1.00 to form a quasi-gel polymer precursor. This quasi-gel polymer precursor upon standing will harden into the polymeric polyurethanes of the present invention.

Upon cure of the quasi-gel polymeric precursor intermediate a polyurethane polymer is formed having the following properties:

| Property | Test method | Result |
|---|---|---|
| Tensile Strength | ASTM D 628 | 7000 psi |
| Elongation | ASTM D 628 | 15% |
| Flexural Modulus | ASTM D 790 | 280,000 psi |

In view of the above disclosure, one of ordinary skill in the art should understand and appreciate that one illustrative embodiment of the present invention is a method of making a molded polyurethane three dimensional shape. Such artificial three dimensional shapes may include rocks, rock walls or faces, tree stumps or limbs, animals, or even people for use in creating displays, sets or other life-like settings. Further the three dimensional shape may be a prototype of consumer product or other specialty product or part, or they may be utilized in architectural settings in which a certain visual appearance is desired. The method of the present illustrative embodiment includes: creating a mold and supporting cradle having a mold cavity conforming to the exterior of shape desired, the mold having a substantial degree of flexibility; spraying a quasi-gel polymer precursor composition into the mold cavity, the quasi-gel polymer precursor composition comprising a mixture of an isocyanate portion and a curative portion and being mixed prior to introduction into a spray gun, carrying out the spraying to build up the molded three dimensional shape to a desired thickness and stripping the cradle and mold from the molded polyurethane three dimensional shape after the curing of the quasi-gel polymer precursor.

It is preferred that the isocyanate portion of the quasi-gel polymer precursor include a isocyanate polymer resin and a molecular sieve drying agent. More preferably, the isocyanate polymer resin should be a mixture of 2,4 and 2,6 diphenyldiisocyanate and the molecular sieve drying agent should be an aluminosilicate. The curative portions of the quasi-gel polymer precursor should preferably include a rigid polymer resin, a gelling agent, a flexible polymer resin a molecular sieve drying agent, a crosslinking agent, a suspension agent and a polymerization co-catalyst. In one preferred illustrative embodiment the rigid polymer resin is a combination of penta erythritol base quadra functional polyol and a polyether base triol, the gelling agent is a aromatic diamine, the flexible polymer resin is a polyether base triol, the molecular sieve drying agent is an aluminosilicate, the crosslinking agent is selected from aldimines, ketimines and oxazolidines, the suspension agent is AntiTerra U which is the salts from alkyamides and esters, and the polymerization co-catalyst is Cocure 55 which is a phenyl mercuric neodecanoate salt. Even more preferable in the illustrative embodiment, the aldimine is IPD-139 A, which is the reaction product of isophorone diamine and isobutyraldehyde, the ketimine is the condensation reaction of para-phenylenediamine reacted with methyl amyl ketone; and the oxazolidine is selected from oxazolidines having the formula:

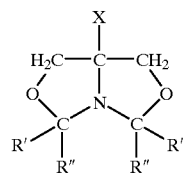

wherein X is selected to be hydrogen, $C_1$ to $C_8$ alkyls or $C_1$ to $C_8$ alkylol and R' and R'' are independently selectable from hydrogen, $C_1$ to $C_3$ alkyl of which 1-aza-3,7-dioxa-5-ethylbicyclo (3.3.0) octane is the most preferred. The mixture of the isocyanate portion and the curative portion of the quasi-gel polymer precursor should have a ratio from about 0.75:1.0 to about 1.25:1.00 and more preferably the ratio of the isocyanate portion and the curative portion is about 1.14:1.00.

In one illustrative embodiment, the quasi-gel polymer precursor includes an additive that alters or otherwise enhances the properties of the final polyurethane polymer. Such additives may be selected from the group consisting of sand, carbon fibers, glass fibers, glass fiber cloth, metal fibers or metal cloth, synthetic fiber, natural fiber, colorants, pigments and combinations thereof.

Another illustrative embodiment of the present invention is a method of spray coating a three dimensional object with a polyurethane polymer coating. Such an illustrative method includes: forming a premixed quasi-gel polymer precursor composition by combining an isocyanate portion and a curative portion to form the quasi-gel polymer precursor; spraying the quasi-gel polymer precursor composition onto the three dimensional object to be coated with the polyurethane polymer coating carrying out the spraying to build up the coating to a desired thickness and allowing the quasi-gel polymer precursor composition to cure thereby becoming the polyurethane polymer coating.

In the present illustrative embodiment of the present invention it is preferred that the isocyanate portion include an isocyanate polymer resin which is preferably a mixture of 2,4 and 2,6 diphenyldiisocyanate and a molecular sieve drying agent which is preferably an aluminosilicate. The curative portion should include: a rigid polymer resin which is preferably a combination of penta erythritol base quadra functional polyol and a polyether base triol, a gelling agent which is preferably an aromatic diamine, a flexible polymer resin which is preferably a polyether base triol, a molecular sieve drying agent which preferably is an aluminosilicate, a crosslinking agent which is preferably selected from aldimines, more preferably IPD-139 A which is the reaction product of isophorone diamine and isobutyraldehyde, ketimines, more preferably the condensation reaction of para-phenylenediamine reacted with methyl amyl ketone, and oxazolidines, more preferably selected from oxazolidines having the formula:

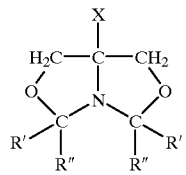

wherein X is selected to be hydrogen, $C_1$ to $C_8$ alkyls or $C_1$ to $C_8$ alkylol and R' and R" are independently selectable from hydrogen, $C_1$ to $C_8$ alkyl and highly preferable the oxazolidine is 1-aza-3,7-dioxa-5-ethylbicyclo (3.3.0) octane, a suspension agent which is preferably AntiTerra U which is the salts from alkyamides and esters, and a polymerization co-catalyst which is preferably Cocure 55 which is a phenyl mercuric neodecanoate salt. The mixture of the isocyanate portion and the curative portion of the quasi-gel polymer precursor should have a ratio from about 0.75:1.0 to about 1.25:1.00 and preferably has a ratio of about 1.14:1.00.

Yet another illustrative embodiment of the present invention is a method of spray forming a polyurethane polymer foam. The illustrative method includes: forming a premixed quasi-gel polymer precursor composition by combining an isocyanate portion and a curative portion to form the quasi-gel polymer precursor; spraying the quasi-gel polymer precursor composition in combination with a sufficient amount of water so as to cause the quasi-gel polymer precursor composition to form a foam of quasi-gel polymer precursor composition upon contact with a surface, and allowing the foam of quasi-gel polymer precursor composition to cure thereby becoming the polyurethane polymer foam.

It is preferred that the isocyanate portion include an isocyanate polymer resin which is preferably a mixture of 2,4 and 2,6 diphenyldiisocyanate. The curative portion should include: a rigid polymer resin which is preferably a combination of penta eythritol base quadra functional polyol and a polyether base triol, a gelling agent which is preferably an aromatic diamine, a flexible polymer resin which is preferably a polyether base triol, a crosslinking agent which is preferably selected from aldimines, more preferably IPD-139 A which is the reaction product of isophorone diamine and isobutyraldehyde, ketimines, more preferably the condensation reaction of para-phenylenediamine reacted with methyl amyl ketone, and oxazolidines, more preferably selected from oxazolidines having the formula:

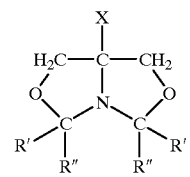

wherein X is selected to be hydrogen, $C_1$ to $C_8$ alkyls or $C_1$ to $C_8$ alkylol and R' and R" are independently selectable from hydrogen, $C_1$ to $C_8$ alkyl and highly preferable the oxazolidine is 1-aza-3,7-dioxa-5-ethylbicyclo (3.3.0) octane, a suspension agent which is preferably AntiTerra U which is the salts from alkyamides and esters, and a polymerization co-catalyst which is preferably Cocure 55 which is a phenyl mercuric neodecanoate salt. The mixture of the isocyanate portion and the curative portion of the quasi-gel polymer precursor should have a ratio from about 0.75:1.0 to about 1.25:1.00 and preferably has a ratio of about 1.14:1.00.

One of ordinary skill in the art should also appreciate and understand that the present invention is not limited to the above described illustrative methods. Thus the present invention includes compositional illustrative embodiments such as a composition resulting from a mixture comprising: a) a polyisocyanate having reactive isocyanate groups; b) a polyol having reactive hydroxyl groups; c) an activated aromatic diamine catalyst; and d) a deactivated amine catalyst selected from aldimines, ketimines and oxazolidines. The resulting mixture forms a quasi-gel polyurethane precursor composition, which cures at room temperature to form a cured polyurethane polymer composition. The deactivated amine catalyst may be selected from aldimines, ketimines or oxazolidines. Preferably the deactivated amine catalyst is an oxazolidine having the formula:

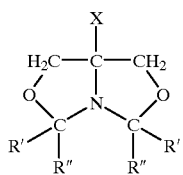

wherein X is selected to be hydrogen, $C_1$ to $C_8$ alkyls or $C_1$ to $C_8$ alkylol and R' and R" are independently selectable from hydrogen, $C_1$ to $C_8$ alkyl A most preferred deactivated amine catalyst is 1-aza-3,7-dioxa-5-ethylbicyclo (3.3.0) octane. It is preferred that the deactivated amine catalyst may be present in a concentration from about 2% to about 20% and more preferably the deactivated amine catalyst compound may be present in a concentration from about 6% to about 8%. The isocyanate is preferably selected from aromatic isocyanates including polymeric diphenylmethane diisocyanate; 4, 4' diisocyanatodiphenylmethane, 2,4 diphenyldiisocyanate and 2,6 diphenyldiisocyanate and combinations thereof The polyol may be selected from dihydridic alcohols having primary or secondary hydroxyl groups, polyhydridic alcohols having primary or secondary hydroxyl groups, preferably the polyol is a polyether based triol, a penta erythritol base quadra functional polyol or a combination or mixture of these. In addition to the above components, the illustrative composition may include an aluminosilicate molecular sieve, a suspension agent such as the commercially available AntiTerra U which is the salts from alkyamides and esters or a conventional co-catalyst compounds such as the commercially available co-catalyst Co-Cure 55 which is a phenyl mercuric neodecanoate.

Another illustrative embodiment of the present invention is a quasi-gel polyurethane precursor composition which is the reaction product of a mixture of a) a polyisocyanate having reactive isocyanate groups; b) a polyol having reactive hydroxyl groups; c) an activated aromatic diamine catalyst; and d) a deactivated amine catalyst selected from aldimines, ketimines and oxazolidines. The resulting mixture forms the quasi-gel polyurethane precursor composition which cures at room temperature to form a cured polyurethane polymer composition.

Yet another illustrative embodiment of the present invention is a quasi-gel polyurethane precursor composition comprising: a) a polyisocyanate having reactive isocyanate groups; b) a polyol having reactive hydroxyl groups; c) an activated aromatic diamine catalyst; and d) a deactivated amine catalyst selected from aldimines, ketimines and oxazolidines. The resulting quasi-gel polyurethane precursor composition cures at room temperature to form a cured polyurethane polymer composition.

While the methods and compositions of this invention have been described in terms of preferred and illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A method of making a molded polyurethane three dimensional shape, the method comprising creating a mold and supporting cradle having a mold cavity conforming to the exterior of shape desired, said mold having a substantial degree of flexibility;

spraying a quasi-gel polymer precursor composition into the mold cavity, said quasi-gel polymer precursor composition comprising a mixture of an isocyanate portion and a curative portion and being mixed prior to introduction into a spray gun, carrying out said spraying to build up the molded three dimensional shape to a desired thickness and stippling said cradle and mold from the molded polyurethane three dimensional shape after the curing of said quasi-gel polymer precursor, wherein the curative portions of the quasi-gel polymer precursor includes a rigid polymer resin, a gelling agent, a flexible polymer resin, a molecular sieve drying agent, a crosslinking agent, a suspension agent and a polymerization co-catalyst, and wherein the rigid polymer resin is a combination of penta erythritol base quadra functional polyol and a polyether base triol, the gelling agent is a aromatic diamine the flexible polymer resin is a polyether base triol, the molecular sieve drying agent is an aluminosilicate, the crosslinking agent is selected from aldimines, ketimines and oxazolidines, the suspension agent is a mixture of salts from alkylamides and esters, and the polymerization co-catalyst is phenyl mercuric neodecanoate.

2. The method of claim 1, wherein the isocyanate portion of the quasi-gel polymer precursor includes a isocyanate polymer resin and a molecular sieve drying agent.

3. The method of claim 1, wherein the isocyanate polymer resin is a mixture of 2,4 and 2,6 diphenyldiisocyanate and the molecular sieve drying agent is an aluminosilicate.

4. The method of claim 1, wherein the aldimine is the reaction product of isophorone diamine and isobutyraldehyde the ketimine is the condensation reaction of paraphenylenediamine reacted with methyl amyl ketone; and the oxazolidine is selected from oxazolidines having the formula:

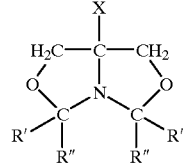

wherein X is selected to be hydrogen, $C_1$ to $C_8$ alkyls or $C_1$ to $C_8$ alkylol and R' and R" are independently selectable from hydrogen, $C_1$ to $C_8$ alkyl.

5. The method of claim 1, wherein the mixture of the isocyanate portion and the curative portion of the quasi-gel polymer precursor is in a ratio from about 0.75:1.0 to about 1.25:1.00.

6. The method of claim 5, wherein the ratio of the isocyanate portion and the curative portion is about 1.14:1.00.

7. The method of claim 1, wherein the quasi-gel polymer precursor includes an additive selected from the group consisting of sand, carbon fibers, glass fibers, glass fiber cloth, metal fibers or metal cloth, synthetic fiber, natural fiber, colorants, pigments and combinations thereof.

8. A method of spray coating a three dimensional object with a polyurethane polymer coating, said method comprising;

forming a premixed quasi-gel polymer precursor composition by combining an isocyanate portion and a curative portion to form said quasi-gel polymer precursor;

spraying said quasi-gel polymer precursor composition onto said three dimensional object to be coated with the polyurethane polymer coating carrying out said spraying to build up the coating to a desired thickness and allowing said quasi-gel polymer precursor composition to cure thereby becoming said polyurethane polymer coating, wherein the curative portion includes a rigid polymer resin which is a combination of penta erythritol base quadra functional polyol and a polyether base triol, a gelling agent which is an aromatic diamine, a flexible polymer resin which is a polyether base triol, a molecular sieve drying agent which is an aluminosilicate, a crosslinking agent which is selected from aldimines, ketimines and oxazolidines, a suspension agent which is a mixture of salts from alkylamides and esters, and a polymerization co-catalyst which is a phenyl mercuric neodecanoate salt.

9. The method of claim 8, wherein the isocyanate portion includes an isocyanate polymer resin which is a mixture of 2,4 and 2,6 diphenyldiisocyanate and a molecular sieve drying agent which is an aluminosilicate.

10. The method of claim 8, wherein the aldimine is the reaction product of isophorone diamine and isobutyraldehyde the ketimine is the condensation reaction of para-phenylenediamine reacted with methyl amyl ketone; and the oxazolidine is selected from oxazolidines having the formula:

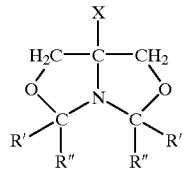

wherein X is selected to be hydrogen, $C_1$ to $C_8$ alkyls or $C_1$ to $C_8$ alkylol and R' and R" are independently selectable from hydrogen, $C_1$ to $C_8$ alkyl.

11. The method of claim 8, wherein the mixture of the isocyanate portion and the curative portion of the quasi-gel polymer precursor is in a ratio from about 0.75:1.0 to about 1.25:1.00.

12. A method of spray forming a polyurethane polymer foam, said method comprising:

forming a premixed quasi-gel polymer precursor composition by combining an isocyanate portion and a curative portion to form said quasi-gel polymer precursor;

spraying said quasi-gel polymer precursor composition in combination with a sufficient amount of water so as to cause the quasi-get polymer precursor composition to form a foam of quasi-gel polymer precursor composition upon contact with a surface, allowing said foam of quasi-gel polymer precursor composition to cure thereby becoming said polyurethane polymer foam wherein the isocyanate portion includes an isocyanate polymer resin which is a mixture of 2,4 and 2,6 diphenyldiisocyanate, and wherein the curative portion includes a rigid polymer resin which is a combination of penta erythritol base quadra functional polyol and a polyester base triol, a gelling agent which is an aromatic diamine, a flexible polymer resin which is a polyether base triol, a crosslinking agent which is selected from aldimines, ketimines and oxazolidines, a suspension agent which is a mixture of salts from alkylamides and esters, and a polymerization co-catalyst which is a phenyl mercuric neodecanoate salt.

13. The method of claim 12, wherein the aldimine is the reaction product of isophorone diamine and isobutyraldehyde the ketimine is the condensation reaction of para-phenylenediamine reacted with methyl amyl ketone; and the oxazolidine is selected from oxazolidines having the formula:

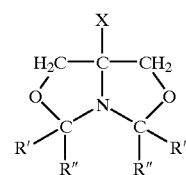

wherein X is selected to he hydrogen, $C_1$ to $C_8$ alkyls or $C_1$ to $C_8$ alkylol and R' and R" are independently selectable from hydrogen, $C_1$ to $C_8$ alkyl.

14. The method of claim 12, wherein the mixture of the isocyanate portion and the curative portion of the quasi-gel polymer precursor is in a ratio from about 0.75:1.0 to about 1.25:1.00.

* * * * *

UNITED STATES PATENT AND TRADEMARK OFFICE
CERTIFICATE OF CORRECTION

PATENT NO. : 6,362,302 B1
DATED : March 26, 2002
INVENTOR(S) : Carl E. Boddie

It is certified that error appears in the above-identified patent and that said Letters Patent is hereby corrected as shown below:

Column 16,
Line 11, delete "stippling" and insert -- stripping --

Column 18,
Line 8, delete "quasi-get" and insert -- quasi-gel --

Signed and Sealed this

Fourth Day of June, 2002

Attest:

Attesting Officer

JAMES E. ROGAN
Director of the United States Patent and Trademark Office